Figure 1:
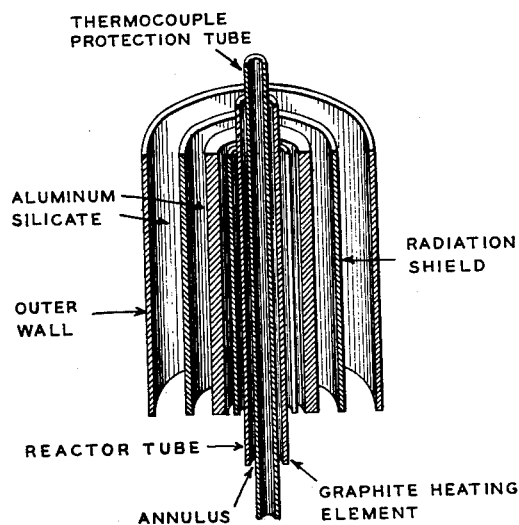

Nov. 10, 1964     J. HAPPEL ETAL     3,156,733
SELECTIVE PYROLYSIS OF METHANE TO ACETYLENE AND HYDROGEN
Filed Dec. 2, 1960     2 Sheets-Sheet 1

INVENTORS
JOHN HAPPEL
LEONARD KRAMER

BY *E. Janet Berry*
ATTORNEY

United States Patent Office 3,156,733
Patented Nov. 10, 1964

3,156,733
SELECTIVE PYROLYSIS OF METHANE TO ACETYLENE AND HYDROGEN
John Happel, 69 Tompkins Ave., Hastings on Hudson, N.Y., and Leonard Kramer, 236 E. 29th St., New York, N.Y.
Filed Dec. 2, 1960, Ser. No. 73,435
6 Claims. (Cl. 260—679)

This invention relates to the pyrolysis of methane to acetylene and hydrogen. More particularly, the present invention relates to an improved method for obtaining acetylene and hydrogen by pyrolysis of methane employing a unique combination of operating conditions.

The pyrolysis of hydrocarbons to acetylene, hydrogen and other products is well known. Heretofore, however, the isolation of acetylene and/or hydrogen by such a procedure has required elaborate product separation and product recovery techniques. Thus, initially devised and previously known straight pyrolytic processes such as the Wulff and Ruhrchemie processes have yielded, in addition to acetylene and hydrogen, variable amounts of alkynes other than acetylene, olefins including ethylene, and paraffins, including a portion of the original methane feed in amounts normally sufficient to require laborious isolation and recovery procedures. More recent modifications of such straight pyrolytic techniques have contained difficultly separable contaminants as well. These latter processes include that employed for the partial combustion of methane and that in which methane is mixed with hot combustion products to yield product streams containing large quantities of carbon dioxide, carbon monoxide and steam in addition to the products obtained from straight pyrolysis as described above.

The only process employing electrical energy which has been in commercial operation is the one developed at the acetylene plant of Chemische Werke Hüls in Germany. This process employs an electric arc for heating the gaseous hydrocarbon feed. In this reactor it is not known at what temperature the acetylene actually forms from methane; however, in its core the arc burns at about 3000° C. while at the end of the reactor tube the temperature runs between 1600 and 2000° C. so that it is apparent that while a portion of the reacting gases is subject to arc temperature, a substantial portion bypasses the hottest part of the arc. Consequently, the process involves an uncontrolled time-temperature pyrolysis which leads on the one hand to the production of acetylenic hydrocarbons such as diacetylene and other alkynes in substantial amounts as the result of extremely high temperature pyrolysis and at the same time leaves a considerable proportion of unreacted methane in the effluent.

Due to the presence of these contaminants and the elaborate procedures required for effective separation of acetylene and hydrogen therefrom, isolation of these components has normally constituted the most expensive phase of prior pyrolytic processes.

Accordingly, it has now been discovered that acetylene and/or hydrogen can be produced by pyrolysis of methane, in good yields and in such a manner as to obviate substantially the hazardous and uneconomic refining and recovery procedures known heretofore. Thus, the process of the present invention provides a new thermal cracking process for producing acetylene and hydrogen from methane.

The process has three areas of advantage. First, it is possible by proper choice of conditions to produce essentially a mixture of acetylene and hydrogen, so that when acetylene is recovered or reacted practically only pure hydrogen remains. Secondly, yields of acetylene based on methane consumption are between two and three times greater than in present commercial processes. Thirdly, energy consumption is consequently much lower than in other processes, including also the traditional carbide process, which incidentally these other processes based on hydrocarbons have not been able to displace.

The process of the invention comprises introducing methane into a reaction zone at a maximum temperature above 1500° C. and sequentially withdrawing the effluent from said reaction zone at a temperature of about 600° C. or less; the space velocity, that is the ratio of volumetric flow rate of methane feed measured at 0° C. and 760 mm. of mercury (Hg) in cubic feet per second, to reaction zone free volume, being within the range of 20 sec.$^{-1}$ to 0.05 sec.$^{-1}$. Maximum temperatures within the reaction zone of 1500° C. to 2000° C. are generally preferred for the purposes of the present invention while a maximum temperature within the range of 1500° C. to 1750° C. normally affords optimum yields in concert with ultimate freedom from contaminants.

It is necessary in this selective pyrolysis process to define carefully the reaction zone in which the major part of the pyrolysis occurs. In the present invention the beginning of the reaction zone is taken to be that point at which the temperature of the reacting gases first reaches a level of about 250° C. below the maximum recorded temperature. The end of the reaction zone is considered to be the point of quenching. In the reaction zone the gas temperature is estimated to be within 100° C. of the wall temperature of the reactor. Thus a substantially isothermal reaction zone is obtained.

It will be evident from the short time afforded the reacting gas within the reaction zone that the aforesaid maximum temperatures must be attained in a very abbreviated period. It will also be apparent that the descent to temperatures substantially below the maxima involves rapid quenching commensurate with the time in the reaction zone. Such quenching or cooling should be effected preferably to a temperature of 300° C. or less. Normally, however, rapid cooling to a temperature of 600° C. or less, e.g. 500° C., is operable and desirable. By virtue of such cooling, the decomposition, hydrogenation or polymerization of the product acetylene is avoided. Cooling to ambient temperatures may then proceed at a somewhat slower and more conventional rate. To achieve the high rate of initial cooling, injection of cold gas or liquid into the product gas is normally employed. It is, of course, preferred that the gas or liquid entrained or admixed with the hot product gases be of such a nature that it does not contaminate the product stream with gases which are difficult to remove and which would thus negate certain of the advantages of the invention.

The pressure within the reaction zone is subatmospheric. Ordinarily, the pressure employed is within the range of 50 mm. Hg absolute to 115 mm. Hg absolute while for most purposes a pressure of from 80 mm. Hg absolute to 115 mm. Hg absolute is preferred.

The feed material fed to the reactor need not be pure methane. Commercial sources of methane, i.e. from natural gas, coke oven gas, etc., contain small amounts of other hydrocarbons, and these have been found to be no detriment. Also varying amounts of gases such as nitrogen and hydrogen, may be present within the feed stream. Small amounts of gases such as, for example, oxygen and carbon dioxide may also be present. It is noted that the amount of coke deposited within the reaction zone of the reactor will increase where the higher hydrocarbons are present.

Where hydrocarbons of higher molecular weight than methane are subjected to temperatures within the range of this invention, it is known that products of the pyrolysis include methane. The decomposition of methane so formed will proceed to form acetylene and hydrogen according to this invention. Thus, it will be evident that if higher molecular weight hydrocarbons than methane are used as such or as impurities in methane feed stock, the reaction will proceed in substantially the same manner as the pyrolysis of methane from an original feed stock. Further, since the primary splitting of the heavier hydrocarbons occurs more rapidly than the cracking of methane itself, the cracking of methane will likewise be the controlling step in pyrolysis of these materials to produce acetylene. Thus, optimum space velocity within the reactor for higher hydrocarbon pyrolysis will be towards the shorter end of the range recited hereinabove, that is .05 sec.$^{-1}$.

Figure 2:
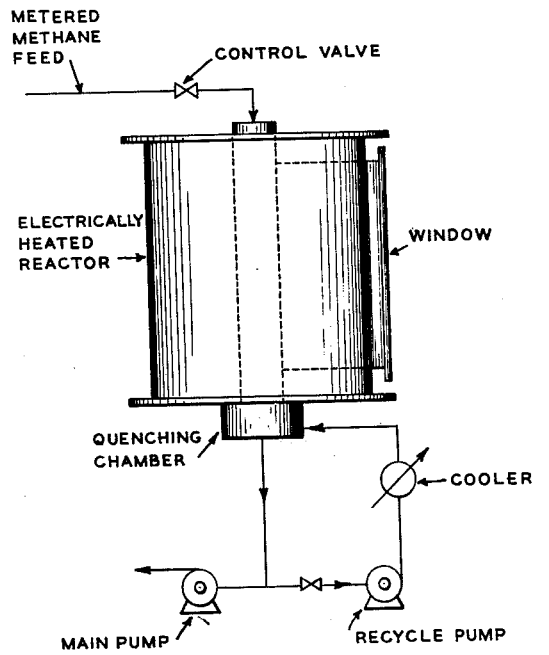
Figure 3:
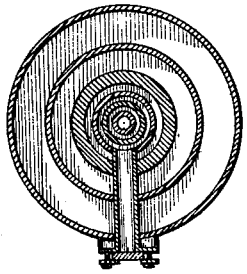

An illustrative arrangement for use in the practice of the present invention on the laboratory scale is shown in accompanying FIGURES 1 to 3. FIGURE 1 is a diagrammatic representation of the elemnts of this illustrative apparatus wherein the carefully Metered Methane Feed is caused to pass through an Electrically Heated Reaction Chamber and rapidly quenched under the conditions described hereinabove. Thus, for example, the maximum temperature within the reaction zone will be within the above described range, e.g. 1750° C. The Methane Feed is drawn from storage metered and passed through a Control Valve. If desired, a metered amount of a suitable inert gas may be incorporated into the feed stream of methane. The pressure of the feed material is measured, and the Feed Stream proceeds to the Electrically Heated Reactor.

A suitable reactor for use herein is seen in side-elevational view in FIGURE 2 and in cross-section in FIGURE 3. As represented in these drawings, which are intended to be illustrative of apparatus for use in the practice of the invention and not limitative thereof, the reactor is seen (FIGURE 3) to be a concentric system of cylindrical tubes, which are progressively larger in diameter. The Methane Feed passes through the length of the reactor and outside the smaller inner tube which protects the thermocouple which measures temperatures within the reactor. The thermocouple arrangement is composed of an alumina Thermocouple Protection Tube and a Platinum-Platinum 10% Rhodium Thermocouple Wire disposed therein along the length of the substantially vertically disposed Thermocouple Protection Tube. This thermocouple is disposed within and along the length of the larger Reactor Tube. These two elements and their relationship are seen in FIGURE 2. The Thermocouple is employed to obtain a longitudinal temperature profile. The Thermocouple Protection Tube is maintained within the Reactor Tube by packing glands at points outside the hot zone. The Reactor Tube is made of alumina and positioned within the Graphite Resistance Element designed to use a low voltage electrical current up to 3 kva., thus providing sufficient heat to effect the maximum temperatures within the Reactor Tube described hereinabove, e.g. 1750° F. The Annulus positioned between the alumina Thermocouple Protection Tube and the larger diameter Reactor Tube thus constitutes the reactor cross-section.

Successive cylindrical walls of insulation material are positioned about the Graphite Heating Element. Thus, for example, refractory walls of Zirconia and Aluminum Silicate, together with an intermediate Radiation Shield of Stainless Steel and a Furnace Outer Wall of copper, are desirably employed. The Outer Wall of the Reactor is desirably water-cooled. A Window is positioned in the outer wall of the reactor to permit observation by an optical pyrometer sighting on the Reactor Tube (through a slit in the Graphite Resistance Element), thus providing means for determining the temperature thereof.

Upon leaving the reaction zone, the gaseous effluent stream enters the Quenching Chamber where rapid cooling of the hot product gas to a temperature in the range of 600° C. to 300° C. or less is caused to occur as described above. As noted earlier, quenching is effected most desirably at this point by mixture of the hot effluent product gases with a portion of this stream withdrawn by the Recycle Pump and returned to the Quenching Chamber after passing through a cooler. Additional cooling may be achieved by water-cooling of the outer metallic surface of the Quenching Chamber. Analysis of the gaseous components, in the product effluent is accomplished by gas chromatographic and mass spectroscopic methods.

It will be evident, that suitable systems and reactors may be employed for the practice of this invention so long as they provide for adequate heat transfer rates into the gaseous phase, and quenching of the reaction immediately following the reaction zone of the reactor.

Suitable devices for this reactor may include, among others, those containing a reaction zone formed of: a space between narrow heated channels of high temperature refractories; a space between regularly disposed heated rods of carbon or high temperature refractory; or a space between previously heated small particles in a moving stream; as well as the annulus employed in the present apparatus.

After leaving the heated, annular reaction zone and the Quenching Chamber, the gas stream may be passed through a Filter (utilizing cotton gauze or other material which removes any entrained solid or liquid particles). The most common substance removed from the product effluent in this manner is small flakes of carbon formed as a product of pyrolysis. Any suitable pumping system such as that represented diagrammatically in FIGURE 1 may be employed. Thus the Main Pump may be employed to draw hydrocarbon feed and product through the Reactor and Quenching Chamber. A Recycle Pump may be employed to recycle a part of the product gas through a cooler and back to the Quenching Chamber for the rapid cooling of newly produced effluent product leaving the Reactor. In addition, a gas sampling system may be provided downstream of the Main Pump including a volumetric meter and gas sample valve.

CONVERSION AND YIELDS

Figure 4:
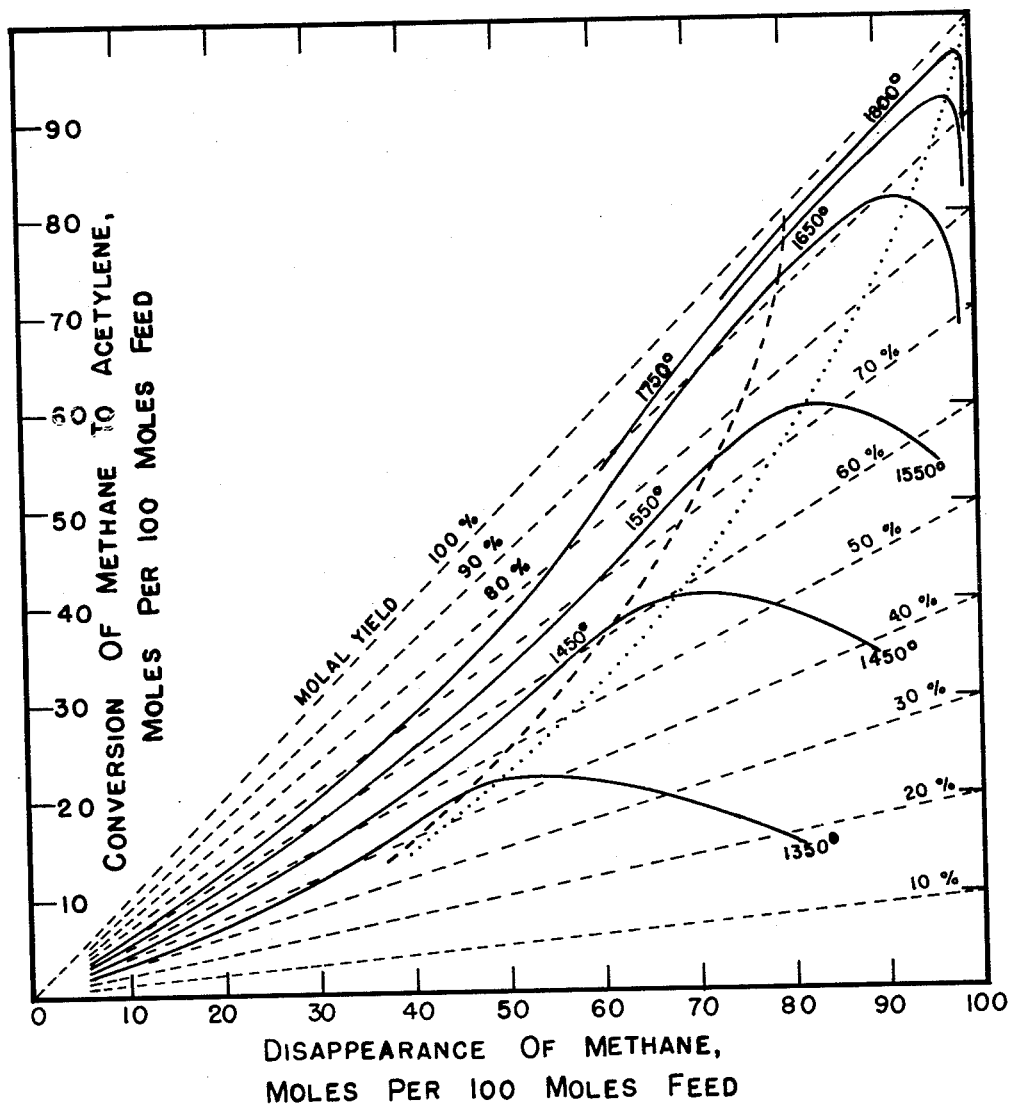

Illustrative of the conversions of methane feed to acetylene and hydrogen accomplished in accordance with the process of the present invention, are the methane conversions illustrated graphically in FIGURE 4 of the drawings wherein the pressure maintained in the Reactor was about 100 mm. Hg. The $x$-axis of this graph represents the moles of methane disappearing during pyrolysis per 100 moles of feed on a once-through basis. The $y$-axis represents the moles converted to acetylene per 100 moles of methane feed on a single or once-through pass of the previously defined reaction zone.

A large volume of data from scores of exemplary runs was obtained with considerable care to delineate the operating conditions. The solid lines on this diagram show the values for each of several temperatures, representing the maximum temperature within the reaction zone. The aforesaid solid lines, drawn to illustrate a series of maximum reactor temperatures, define the results obtained at the specified conditions. Comparative results obtained at maximum temperatures of 1350° C. and 1450° C. temperatures below those of the present invention, i.e. below 1500° C., but occurring within a reaction zone approaching the isothermal state are seen in the lower portion of FIGURE 4. It is especially to be noted that there is only one space velocity for a given temperature, which defines the methane disappearance and its conversion to acetylene. For example, at a value of Disappearance of 60 moles of methane per 100 moles of feed on a once-through basis and at a temperature corresponding to the solid line of 1550° C. maximum temperature, the space velocity giving these results was about 3.3 sec.$^{-1}$ as defined above. In fact, the disappearance of methane can be correlated with a first-order rate equation for a homogeneous gas reaction. Thus, the disappearance of methane may be approximated by the equation $$k = 0.721 \times 10^{12} \; e^{-75,400/RT} \; \text{sec.}^{-1}$$

where R is the gas constant and T is the temperature in degrees Kelvin.

The series of straight dotted lines drawn at different angles from the origin of FIGURE 4, show the yield in terms of the ratio of Conversion to Disappearance, i.e. moles of methane converted to acetylene per 100 moles of methane disappearance. The upper or 45° line represents 100% yield; each lower one has its respective value indicated. This yield is, of course, based only on the methane which disappears in a single pass; and in effect it represents what would be obtained on an over-all basis if all of the methane in the product stream were to be continually repassed through the reactor under the same conditions. These are simply arithmetic ratios indicating the yield obtainable by recycle of unconverted methane. If a line is drawn through the origin so that it is tangent to each of the solid or temperature lines, in each case there is shown the maximum yield on an over-all basis corresponding to a given reactor temperature. A broken-line curve connecting these points of tangency indicates in general the maximum yields which are attainable as a function of operating temperature. At lower conversions, it should be noted that ethylene will also be obtained as a by-product.

It is also evident from a study of the graph of FIGURE 4 that within the critical limitations defined hereinabove, the relationship of critical factors may be substantially altered as desired. Thus, at 1650° C., for example, if it is desired to conserve over-all methane consumption, operation at a rate at which 80 moles of methane are caused to disappear per 100 moles of methane feed will correspond to 75 moles of methane converted to acetylene per 100 moles of feed in a single pass. If the unconverted methane is repassed through the reactor, the over-all yield on a mole basis from this process will be 94 percent; that is 94 moles of methane are converted to acetylene for each 100 moles of methane disappearance.

If, however, unconverted methane cannot be conveniently recovered and repassed through the reactor, one is able to operate within the purview of the invention at conditions of maximum conversion of methane to acetylene on a once-through basis. This is indicated by the curved, dotted line passing through the highest point of each of the temperature lines of the graph of FIGURE 4. Thus, in a single pass, at a maximum pyrolysis temperature of 1650° C., a 91 percent disappearance of methane charged to the reactor corresponds to a Conversion of 80 moles of methane to acetylene per 100 moles of methane, and this is the highest or maximum conversion obtainable at this temperature under any space velocity conditions.

It should be noted that at any temperature line, the curve representing Maximum Conversion is always to the right of the curve representing maximum yield and maximum conversion is always at a higher conversion than that for maximum yield; also, it always is at a higher value of Disappearance of acetylene. This is possible because at Maximum Conversion, a part of the acetylene formed is decomposing as shown by the corresponding higher Disappearance.

Finally, it may be desired to make the product gas so that after acetylene removal a relatively pure hydrogen stream will remain with very limited amounts of methane therein. In this, at 1650° C., it will be apparent that a 99 percent Disappearance of methane charged, that is 99 moles of methane disappearing during pyrolysis per 100 moles of methane feed, corresponds to 72 moles of methane converted to 36 moles of acetylene per 100 moles of feed in a single pass. This curve thus shows the operation of the process at higher values of Disappearance than that corresponding to the maximum conversion.

The graph of FIGURE 4 in general defines the conditions for any desired operation; i.e. maximum conversion per pass, maximum yield, minimum unconverted methane in the effluent, etc.

It should also be noted that, after acetylene has been stripped from the product gas according to standard procedures, hydrogen of higher purity and better methane utilization than that obtainable by the primary cracking to acetylene, can be obtained by a subsequent second-stage pyrolysis of the effluent.

Curved solid lines are shown in FIGURE 4 indicating the conversion to acetylene at temperatures of 1750° C. and 1800° C. These lines are based on a correlation of all the data obtained including that obtained at these as well as at lower temperatures. Operating conditions are so critical in this region that although available data clearly establish the operability of the process, they are not sufficiently definite to accurately define the curves.

Thus, by operating at maximum temperatures of 1800° C. to 2000° C. and within the other critical limitations described hereinabove, disappearances of methane of 99 percent, and yields of acetylene utilizing 95 moles per 100 moles methane feed disappearing are attainable. Temperatures in excess of 2000° C. give little practical improvement in the amount or purity of acetylene yield and may result in the presence of significant amounts of diacetylene in the effluent.

It should be noted that the maximum yields referred to the discussion relating to FIGURE 4 hereof while indicative of those had on an average do not necessarily represent the highest yields attainable within the purview of the present invention on a single run or as the result of a plurality of such runs.

The following examples taken from the large number of experimental determinations which were made to define the curves of FIGURE 4 are further illustrative of the invention. In each example, the terms $C_0$, $C_A$ and $C_E$ which appear are defined as follows:

$C_0$ = mole of methane disappearance per 100 moles of feed per pass $C_A$ = moles of methane converted to acetylene per 100 moles of feed per pass $C_E$ = moles of methane converted to ethylene per 100 moles of feed per pass Further, the analyses presented do not include a few tenths of a percent of other hydrocarbons, mostly ethane, which appeared in almost all runs.

*Example 1*

A gas consisting of over 99 percent methane and containing small amounts of nitrogen, hydrogen, oxygen, and carbon monoxide was passed through a reactor of the type described hereinabove; the volume of gas fed to the reactor, that is, the volumetric flow rate of hydrocarbon feed at 0° C. and one atmosphere of absolute pressure, which may be expressed as $V_f$, in relation to the free volume within the reaction zone, that is, the reaction zone where maximum pyrolytic temperature is attained, and which may be expressed as $V_f$, is 1.96 sec.$^{-1}$. The reaction zone as previously defined begins at that point along the reactor where a measured temperature is reached of approximately 250° C. below the maximum observed temperature and ends at the point of quench. Naturally that portion of the system in which the temperature is below that of the reaction zone inlet may be considered a preheater section in which a small amount of the total reaction occurs.

The space velocity of 1.96 sec.$^{-1}$ is chosen as the means of describing the contact time of gases in the reaction zone because the conventional calculation of contact time is subject to differences in interpretation due to the rapidly changing gas volume and conversion.

For this example the space velocity of 1.96 sec.$^{-1}$ corresponds to a contact time of approximately 0.010 sec. All volumes employed throughout this specification unless otherwise explicitly indicated refer to volumes at standard conditions of 0° C. and one atmosphere. The average reactor pressure was maintained at 101 mm. Hg abs.; and the maximum temperature within the reaction zone of the furnace at between 1550 and 1575° C. At the reactor exit, that is the exit from the reaction zone, the product gas was quenched with cooled, recycle product gas which was recycled at about 10 times the product gas rate. Mixing and quenching took place in a water-cooled head.

Product analysis in percent by volume was as follows:

| | |
|---|---|
| Acetylene | 16.1 |
| Ethylene | 0.7 |
| Hydrogen | 76.6 |
| Methane | 6.6 | which corresponds to:

| | Percent |
|---|---|
| $C_0$ | 87.8 |
| $C_A$ | 60.0 |
| $C_E$ | 2.6 |

This would appear to represent approximately maximum methane conversion to acetylene per 100 moles of methane feed in a single pas at this temperature and corresponds to an over-all yield of 68.4 moles of methane converted to acetylene per 100 moles of methane disappearance.

It is noted that the symbols $V_f$, $V_R$, $C_0$, and $C_A$, and $C_E$ employed herein are utilized hereinafter with the same signification as indicated hereinabove.

*Example 2*

(a) A gas consisting of over 99% methane was passed through a reactor of the type described hereinabove and utilized in Example 1 having a maximum temperature within the reaction zone thereof of 1650° C.–1675° C. The flow of methane through the reactor was adjusted so that $V_f/V_R = 1.85$ sec.$^{-1}$. Average reactor pressure was 100 mm. Hg abs. The gas product was quenched as in Example 1.

Product analysis in percent by volume was:

| | |
|---|---|
| Acetylene | 21.1 |
| Ethylene | 0.0 |
| Hydrogen | 74.0 |
| Methane | 4.9 | which corresponds to:

| | Percent |
|---|---|
| $C_0$ | 90.7 |
| $C_A$ | 80.5 |
| $C_E$ | 0.0 |

This represents an approximately maximum methane conversion to acetylene per 100 moles of methane feed in a single pass at this temperature and corresponds to an over-all yield of 88.6 moles of methane converted to acetylene per 100 moles of methane disappearance.

(b) Repeating the aforesaid procedure except that the space velocity, $V_f/V_R$, is changed to 4.85 sec.$^{-1}$, results in the following values:

| | Percent |
|---|---|
| $C_0$ | 64.3 |
| $C_A$ | 57.2 |
| $C_E$ | 0.7 | which corresponds to an over-all yield of 89.1 moles of methane converted to acetylene per 100 moles of methane disappearance. It will be noted, however, that although the over-all yield is somewhat higher, ethylene and methane are present in larger amounts in this product.

*Example 3*

Repeating the procedure of Example 2(a), employing the same feed composition, temperature and pressure thereof but with an adjusted space velocity, $V_f/V_R$, of 0.612 sec.$^{-1}$ a product analysis expressed in percent by volume was obtained as follows:

| | |
|---|---|
| Acetylene | 18.0 |
| Ethylene | 0.0 |
| Hydrogen | 81.4 |
| Methane | 0.6 | which corresponds to:

| | Percent |
|---|---|
| $C_0$ | 98.7 |
| $C_A$ | 71.6 |
| $C_E$ | 0.0 |

This corresponds to an over-all yield of 72.5 moles of methane converted to acetylene per 100 moles of methane disappearance. It will be noted that the gas stream is substantially free of both methane and ethylene. Operation under these conditions is particularly advantageous where pure hydrogen is desired and where methane recovery is not desired. Also under these conditions careful analysis indicated that effluent contained less than 0.1%=vol. of all higher molecular weight hydrocarbons.

*Example 4*

Repeating the procedure of Example 3 and employing the composition, space velocity, and pressure recited therein, but with an adjustment of the maximum temperature within the reaction zone to 1740° C. to 1770° C., the product analysis in percent by volume obtained was:

| | |
|---|---|
| Acetylene | 13.3 |
| Ethylene | 0.0 |
| Hydrogen | 86.5 |
| Methane | 0.2 | which corresponds to:

| | Percent |
|---|---|
| $C_0$ | 99.5 |
| $C_A$ | 53.0 |
| $C_E$ | 0.0 |

Thus even at these relatively high temperatures the decomposition of acetylene is a relatively slow reaction and yields are not extremely sensitive to overcracking.

*Example 5*

A gas consisting of over 99% methane was passed through a reactor having a maximum temperature within the reaction zone of approximately 1900° C. The flow of methane was adjusted so that $V_f/V_R =$ $$\frac{45.9 \times 10^{-5} \text{std. cubic ft. sec.}}{4.35 \times 10^{-5} \text{ cubic ft.}} = 10.55 \text{ sec.}^{-1}$$

Average reactor pressure was maintained at approximately 110 mm. Hg abs.

Product analysis in percent by volume was:

| | |
|---|---|
| Acetylene | 13.6 |
| Ethylene | 0.5 |
| Hydrogen | 71.5 |
| Methane | 13.4 |

The analysis corresponds to:

| | Percent |
|---|---|
| $C_0$ | 76.0 |
| $C_A$ | 47.8 |
| $C_E$ | 1.8 |

The reduced acetylene yield in this run was induced by insufficient quenching, which was caused by leakage of some of the feed methane to the area outside of the reactor. This leakage also resulted in a portion of the methane feed coming into contact with the graphite heater element of the reactor outside of the reaction zone which operated at a temperature greatly in excess of the maximum reaction zone temperature and substantially in excess of 2000° C. This resulted in the formation of a minor but detectable yield of 0.5 percent of diacetylene and other components in a yield of less than 0.1 percent concentration.

What is claimed is:

1. A process for the pyrolysis of methane to produce acetylene and hydrogen which comprises heating a methane containing stream, without substantial interruption, within a pyrolytic reaction zone at sub-atmospheric pressure and at a maximum temperature within the range of 1500° C. to 2000° C.; the space velocity of hydrocarbon through said reaction zone being within the range of 20 sec.$^{-1}$ to 0.05 sec.$^{-1}$; the initiation of said reaction zone being characterized by a temperature of about 250° C. below the aforesaid maximum temperature; withdrawing the gaseous product from said reaction zone and quenching said product rapidly to a temperature of at least 600° C.

2. A process for the continuous pyrolysis of methane to produce acetylene and hydrogen which comprises heating methane within a reaction zone at a continuous pressure within the range of 50 mm. Hg to 115 mm. Hg at a maximum temperature of from 1500° C. to 2000° C.; the space velocity of said methane through said continuous reaction zone being within the range of 20 sec.$^{-1}$ to 0.05 sec.$^{-1}$; the initiation of the continuous pyrolysis reaction zone being characterized by a temperature of about 250° C. below the aforesaid maximum temperature; withdrawing the gaseous product from said reaction zone and quenching said product to a temperature of at least 600° C.

3. A process for the pyrolysis of methane to produce acetylene and hydrogen which comprises heating, methane without interruption, within a reaction zone at a maximum temperature of from 1500° C. to 1750° C. and at a pressure within the range of 80 mm. Hg to 115 mm. Hg; the space velocity of hydrocarbon through said reaction zone being within the range of 20 sec.$^{-1}$ to 0.05 sec.$^{-1}$; the initiation of said reaction zone being characterized by a temperature of about 250° C. below the aforesaid maximum temperature; withdrawing the gaseous product from said reaction zone and quenching said product to a temperature of 600° C.

4. A process for the pyrolysis of methane to produce acetylene and hydrogen which comprises passing and continuously heating, methane, within a substantially isothermal reaction zone at a maximum temperature of from 1500° C. to 1750° C. and at a pressure within the range of 80 mm. to 115 mm. Hg; the ratio of volumetric flow rate of methane measured at 0° C. and 760 mm. Hg in cubic feet per second to the volume of the reaction zone being within the range of 20 sec.$^{-1}$ to 0.05 sec.$^{-1}$, the initiation of said reaction zone being characterized by a temperature of about 250° C. below the aforesaid maximum temperature; withdrawing the gaseous product from said reaction zone and quenching said product to a temperature of about 300° C.

5. A process for the pyrolysis of methane to produce acetylene and hydrogen which comprises continuously subjecting methane to pyrolysis at sub-atmospheric pressure and at a maximum temperature within the range of 1500° C. to 2000° C.; the space velocity of methane during pyrolysis being within the range of 20 sec.$^{-1}$ to 0.05 sec.$^{-1}$; the initiation of said pyrolysis reaction being characterized by a temperature of about 250° C. below the said maximum temperature and immediately thereafter quenching the pyrolysis products.

6. A process for the pryolsis of methane to produce acetylene and hydrogen which comprises heating without interruption a methane-containing hydrocarbon feed within a pyrolytic reaction zone at sub-atmospheric pressure and at a maximum temperature within the range of 1500° C. to 2000° C.; the space velocity of hydrocarbon feed through said reaction zone being within the range of 20 sec.$^{-1}$ to 0.05 sec.$^{-1}$; the initiation of said reaction zone being characterized by a temperature of about 250° C. below the said maximum temperature; continually withdrawing the gaseous product from said reaction zone and quenching said product immediately to a temperature of at least 600° C.

References Cited in the file of this patent

UNITED STATES PATENTS

| | | |
|---|---|---|
| 2,739,994 | Bills | Mar. 27, 1956 |
| 2,751,424 | Hasche | June 19, 1956 |
| 2,920,123 | Oldershaw et al. | Jan. 5, 1960 |